United States Patent
Hata (10) Patent No.: US 7,423,353 B2
(45) Date of Patent: Sep. 9, 2008

(54) VEHICLE ANTI-THEFT SYSTEM

(75) Inventor: Toshiaki Hata, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 169 days.

(21) Appl. No.: 11/318,545

(22) Filed: Dec. 28, 2005

(65) Prior Publication Data

US 2007/0164610 A1    Jul. 19, 2007

(30) Foreign Application Priority Data

Aug. 16, 2005    (JP)    ............................. 2005-235818

(51) Int. Cl.
*B60R 25/02* (2006.01)
*B60R 25/04* (2006.01)

(52) U.S. Cl. ............. 307/10.3; 340/426.34; 340/426.36

(58) Field of Classification Search ............... 307/10.2, 307/10.3; 340/426.11, 426.17, 426.25, 426.34, 340/426.36, 427
See application file for complete search history.

(56) References Cited

U.S. PATENT DOCUMENTS

| | | | | | |
|---|---|---|---|---|---|
| 5,991,673 | A | * | 11/1999 | Koopman et al. | ............. 701/32 |
| 6,100,792 | A | * | 8/2000 | Ogino et al. | ............. 340/426.25 |
| 6,107,914 | A | * | 8/2000 | Greene | ................. 340/426.25 |
| 6,927,676 | B2 | * | 8/2005 | Edens et al. | ............. 340/426.1 |
| 7,071,819 | B2 | * | 7/2006 | Konno et al. | ................ 340/427 |
| 7,161,262 | B2 | * | 1/2007 | Nagae et al. | ............... 307/10.4 |
| 2004/0004397 | A1 | * | 1/2004 | Nagae et al. | ............... 307/10.3 |

FOREIGN PATENT DOCUMENTS

| | | |
|---|---|---|
| JP | 04-015141 B2 | 1/1992 |
| JP | 2003-025959 | 1/2003 |
| JP | 2004-025938 | 1/2004 |

* cited by examiner

*Primary Examiner*—Michael J Sherry
*Assistant Examiner*—Andrew M Deschere
(74) *Attorney, Agent, or Firm*—Sughrue Mion, PLLC (57) ABSTRACT

A propellant anti-theft system can not only perform permission/stop of operation of a vehicle in a simple and easy manner without using a key, but also suppress the theft and reuse of vehicle parts. The system includes a portable device and an on-board device installed on the vehicle, and further includes an engine control device, a switch and various units, all of which are connected to the on-board device. The on-board device includes a transmitter receiver, a storage circuit and a control circuit. The portable device includes a transmitter receiver, a storage circuit and a control circuit. The control circuit of the on-board device compares common data possessed by itself and common data stored in microprocessor units of the engine control device and the various units, and unlocks a steering locking section included in the various units and outputs an engine starting permission signal to the engine control device when both of the individual pieces of common data coincide with each other.

6 Claims, 6 Drawing Sheets

VEHICLE ANTI-THEFT SYSTEM

BACKGROUND OF THE INVENTION

1. Field of the Invention

The present invention relates to an anti-theft system that can be applied to a propellant such as a vehicle that is propelled by an engine (internal combustion engine) installed thereon (e.g., a motorcycle, an ocean vessel, a jet propulsion boat, etc.). In particular, the invention relates to a propellant anti-theft system that is simplified in its system configuration and operation.

2. Description of the Related Art

In the past, when an engine of a vehicle or the like is started, one can turns on a key switch for engine starting in a mechanical manner with the use of a cylinder key that is possessed only by an authorized driver. Accordingly, it is impossible to start the engine without the use of a qualified key, which serves to achieve a vehicle anti-theft effect. However, even if the vehicle anti-theft function is achieved by depending upon the key, which can be reproduced relatively easily, so a satisfactory anti-theft effect can not necessarily be achieved.

Accordingly, there has been proposed a system in which to strengthen the anti-theft effect, information for specifying or identifying a key of the vehicle of concern is transmitted from the key to a key cylinder, so that the transmitted information from the key is identified on the side of the key cylinder, and a permission to start the engine is given only when the transmitted information indicates normal information (see, for example, a first patent document: Japanese examined patent application publication No. H4-15141).

In the above-mentioned known system, an annular core with a rotor coil being wound therearound is arranged in the periphery of a keyway or key insertion hole in the key cylinder, and a shaft-like core with a key coil being wound therearound is arranged in the interior of the key with the shaft-like core being arranged near the annular core to form a pair of magnetic circuits, whereby information for driving the engine is sent and received between the key and the key cylinder through the magnetic circuits.

In the known propellant anti-theft system, a certain anti-theft effect can be obtained as stated above but there is a problem that satisfactory security can not be achieved.

In addition, there is also another problem that no preventive measure exists against theft of the vehicle at the time when the driver inadvertently left the vehicle with the key being kept inserted in the key cylinder.

Moreover, although it can be considered that a lamp is installed on the key cylinder in view of the fact that when the engine is started at night, the keyway in the key cylinder can not be found easily in the dark and it takes time to start the engine, there is a restraint on the design of a driver's seat and therearound due to the existence of the key cylinder, and besides the installation of the lamp on a relatively inexpensive propellant such as a motorcycle, etc., leads to an increase in costs, and hence such a measure is not practical.

Further, there is still another large problem that various parts such as an ignition control unit, a fuel control unit, meters, a steering locking section and so on might be stolen after the vehicle has been destroyed.

SUMMARY OF THE INVENTION

The present invention is intended to solve the various problems as referred to above, and has for its object to obtain a propellant anti-theft system which can make unnecessary a key and a key cylinder thereby to enable the operation of an engine to be permitted or stopped in a simple and easy manner without using any key as well as to suppress the theft and reuse of vehicle parts.

A propellant anti-theft system according to the present invention includes: an engine and a propellant side device installed on a propellant; an engine control device and a manually operable switch connected to the propellant side device; a plurality of units including a steering locking section connected to the propellant side device; and a portable device that is possessed by a driver of the propellant. The propellant side device includes: a propellant side transmitter receiver for performing two-way communications between the propellant side device and the portable device; a propellant side storage circuit that stores a verification code for the portable device; and a propellant side control circuit that is connected to the propellant side transmitter receiver, the propellant side storage circuit and the switch. The portable device includes: a portable device side transmitter receiver for performing two-way communications between the portable device and the propellant side device; a portable device side storage circuit that stores an inherent encrypted code corresponding to the propellant; and a portable device side control circuit that is connected to the portable device side transmitter receiver and the portable device side storage circuit. The propellant side control circuit and the propellant side transmitter receiver send a query signal containing the verification code to the portable device side transmitter receiver in response to an operation signal of the switch. The portable device side control circuit and the portable device side transmitter receiver receive the signal sent from the propellant side device thereby to read the encrypted code from the portable device side storage circuit, and at the same time to send an answer signal containing the encrypted code corresponding to the query signal to the propellant side transmitter receiver. When the answer signal corresponds to the query signal, the propellant side control circuit unlocks the steering locking section and at the same time permits starting of the engine. The engine control device and the plurality of units are provided with microprocessor units installed thereon, respectively. The respective microprocessor units of the engine control device and the plurality of units have common data between themselves and the propellant side device. The propellant side control circuit compares the common data that is possessed by itself and the common data that is stored in the respective microprocessor units with each other, and unlocks the steering locking section and at the same time outputs a signal to permit starting of the engine to the engine control device when both of the common data coincide with each other.

According to the present invention, an anti-theft effect can be improved to a great extent by making common data inherent to the propellant (vehicle) be possessed by the respective units mounted on the propellant and be compared with each other. In addition, it is possible to suppress the theft and reuse of the parts of the propellant by spreading the system in the market.

The above and other objects, features and advantages of the present invention will become more readily apparent to those skilled in the art from the following detailed description of a preferred embodiment of the present invention taken in conjunction with the accompanying drawings.

DESCRIPTION OF THE PREFERRED EMBODIMENT

Hereinafter, a preferred embodiment of the present invention will be described in detail while referring to the accompanying drawings. Here, reference will be made to the case where a propellant anti-theft system is applied to a vehicle (e.g., motorcycle).

Embodiment 1

Figure 1:
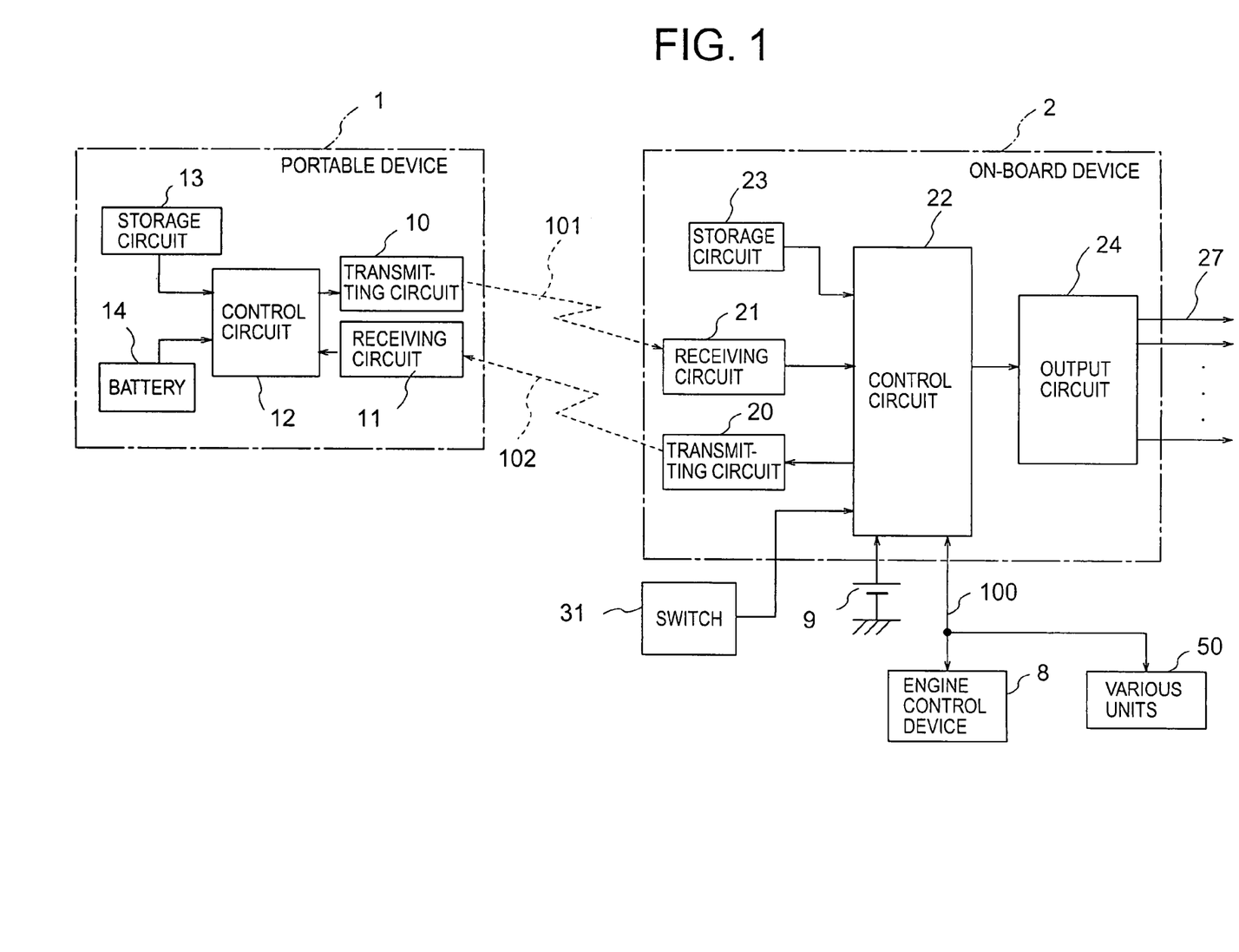
FIG. 1 is a block diagram schematically showing the overall configuration of a propellant anti-theft system according to a first embodiment of the present invention.

FIG. 1 is a block diagram that schematically shows the overall configuration of a propellant anti-theft system according to a first embodiment of the present invention, in which a portable unit side transmitter receiver and a propellant side (vehicle side) transmitter receiver are shown as mutually associated with each other.

In FIG. 1, the propellant anti-theft system includes a portable device 1 that is possessed by an authorized driver (user) and an on-board device 2 that is installed on a vehicle (not shown).

The portable unit 1 includes a transmitting circuit 10 and a receiving circuit 11 that together constitute a portable unit side transmitter receiver, a portable unit side control circuit 12 (hereinafter referred to simply as a "control circuit"), a portable unit side storage circuit 13 (hereinafter referred to simply as a "storage circuit") in which an encrypted code is stored, and a battery 14 in the portable device 1.

The control circuit 12 is operated by electric power fed from the battery 14 to read the encrypted code from the storage circuit 13, and at the same time to perform the transmission and reception of radio waves to and from the on-board device 2 through the transmitting circuit 10 and the receiving circuit 11.

On the other hand, the on-board device 2 includes a transmitting circuit 20 and a receiving circuit 21 that together constitute a vehicle side transmitter receiver, a vehicle side control circuit 22 (hereinafter referred to simply as a "control circuit"), a vehicle side storage circuit 23 (hereinafter referred to simply as a "storage circuit") in which an verification encrypted code hereinafter referred to as a "verification code") is stored, and an output circuit 24.

The control circuit 22 is operated by electric power fed from a vehicle-mounted battery 9 to read the verification code from the storage circuit 23, and at the same time to perform the transmission and reception of radio waves to and from the portable device 1 through the transmitting circuit 20 and the receiving circuit 21.

The portable device 1 and the on-board device 2 mutually transmit and receive radio transmission and reception signals 101, 102 through the transmitting circuit 10 and the receiving circuit 11 as well as the transmitting circuit 20 and the receiving circuit 21, respectively.

A switch 31 in the form of an external operation button in the vehicle is connected to the control circuit 22 in the on-board device 2. The control circuit 22 calculates a control signal 27 based on the operating condition of the vehicle and the result of verification in response to an operation signal of the switch 31, and outputs the control signal 27 to an external relay (to be described later) or the like through the output circuit 24.

In addition, the control circuit 22 is constructed such that it is connected to an engine control device 8 and a variety of kinds of units 50 through a communication line 100 so as to be able to perform two-way communications to the engine control device 8 and the various units 50.

Figure 2:
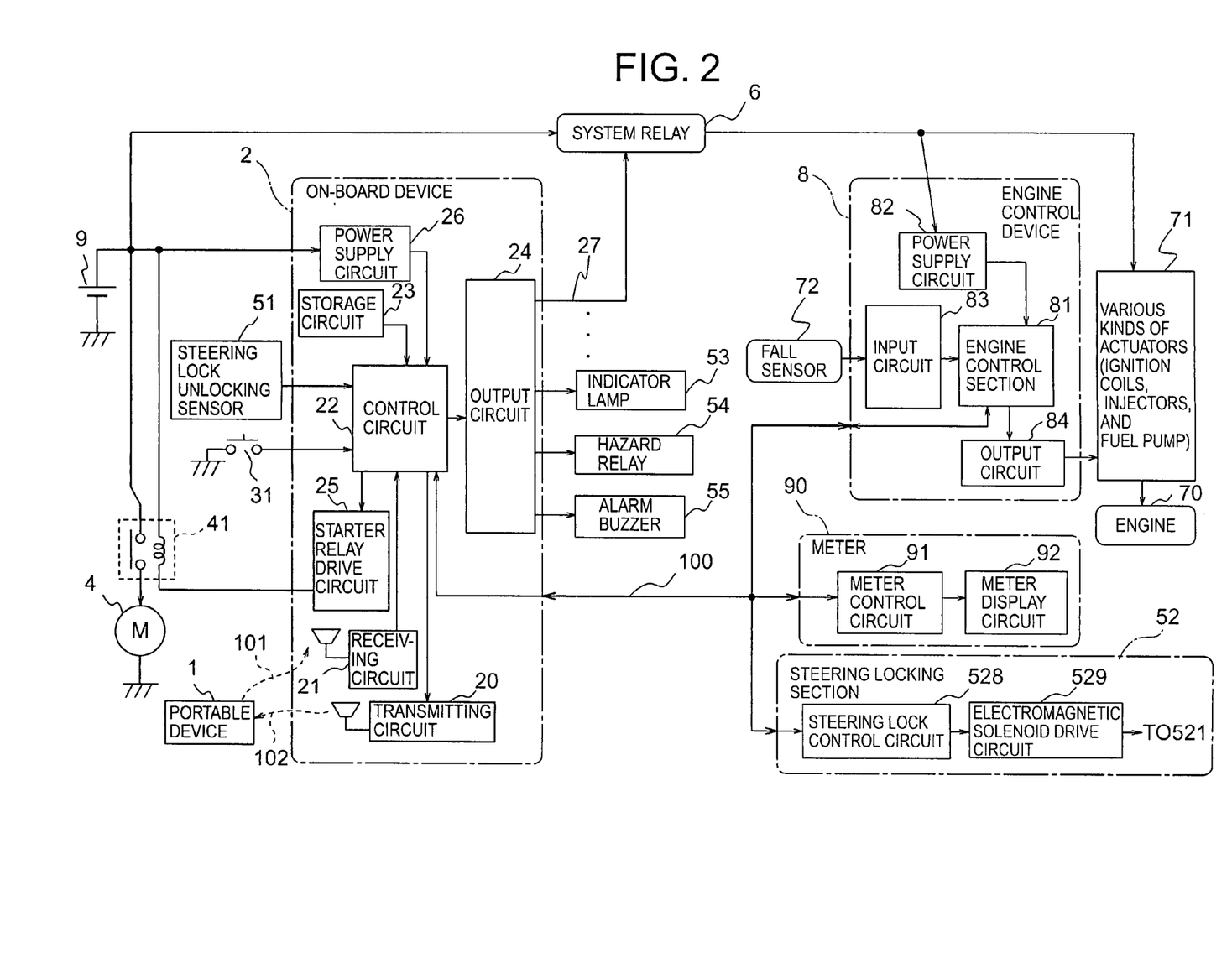
FIG. 2 of is a block diagram showing a specific functional configuration of an on-board device with its peripheral units according to the first embodiment of the present invention.

FIG. 2 is a block diagram that specifically shows the configuration of on-vehicle device 2 in FIG. 1 in conjunction with the engine control device 8 and the peripheral equipment.

In FIG. 2, not only the engine control device 8, the on-board battery 9, and the switch 31 as referred to above but also a system relay 6, a starter relay 41 through which a current is supplied from the on-board battery 9 to a starter 4 (motor), a steering lock unlocking sensor 51, a steering locking section 52, an indicator lamp 53 that performs various indications, a hazard relay 54 for driving an alarm, an alarm buzzer 55, and a meter 90 are connected to the on-vehicle device 2.

The meter 90 is composed of a meter control circuit 91 and a meter display circuit 92.

The steering locking section 52 includes a steering lock control circuit 528, an electromagnetic solenoid drive circuit 529, and a lock mechanism (electromagnetic solenoid 521 and so on to be described later).

The steering locking section 52 and the meter 90 together constitute the various units 50, and they are connected to the engine control device 8 and the control circuit 22 through the communication line 100.

Here, note that other suitable units may be connected to the engine control device 8 and the control circuit 22 as the various units 50 as required.

In addition, though not illustrated here, a vibration sensor for theft detection can be connected to the control circuit 22, as required.

A relay group including the system relay 6, the starter relay 41, etc., and a sensor group including the steering lock unlocking sensor, etc., together constitute the peripheral equipment of the on-board device 2.

The on-board device 2 includes, in addition to the above-mentioned respective circuits 20 through 24, a starter relay drive circuit 25 for driving the starter relay 41, and a power supply circuit 26 connected to the on-board battery 9 for supplying electric power to the control circuit 22.

The starter relay drive circuit 25 and the steering lock unlocking sensor 51 are connected to the control circuit 22 in the on-board device 2.

In addition, the control signal 27 from the output circuit 24 is input to the system relay 6, the indicator lamp 53, the hazard relay 54 and the alarm buzzer 55.

The engine control device 8 includes an engine control section 81, a power supply circuit 82, an input circuit 83 and an output circuit 84, all these circuits being connected to the engine control section 81. The engine control device 8 serves to drive and control an engine 70 through various kinds of actuators 71 (ignition coils, injectors, a fuel pump, etc.).

In the engine control device 8, the power supply circuit 82 is connected to the on-board battery 9 through the system relay 6 for supplying electric power to the engine control section 81.

A fall sensor 72 is connected to the input circuit 83, and the various kinds of actuators 71 are connected to the output circuit 84.

Electric power is supplied from the on-board battery 9 to the engine control device 8 and the various kinds of actuators 71 through the system relay 6.

The engine control section 81 in the engine control device 8 is connected to the output circuit 24 in the on-board device 2 through the communication line 100 that enables two-way communications (transmission and reception).

Figure 3:
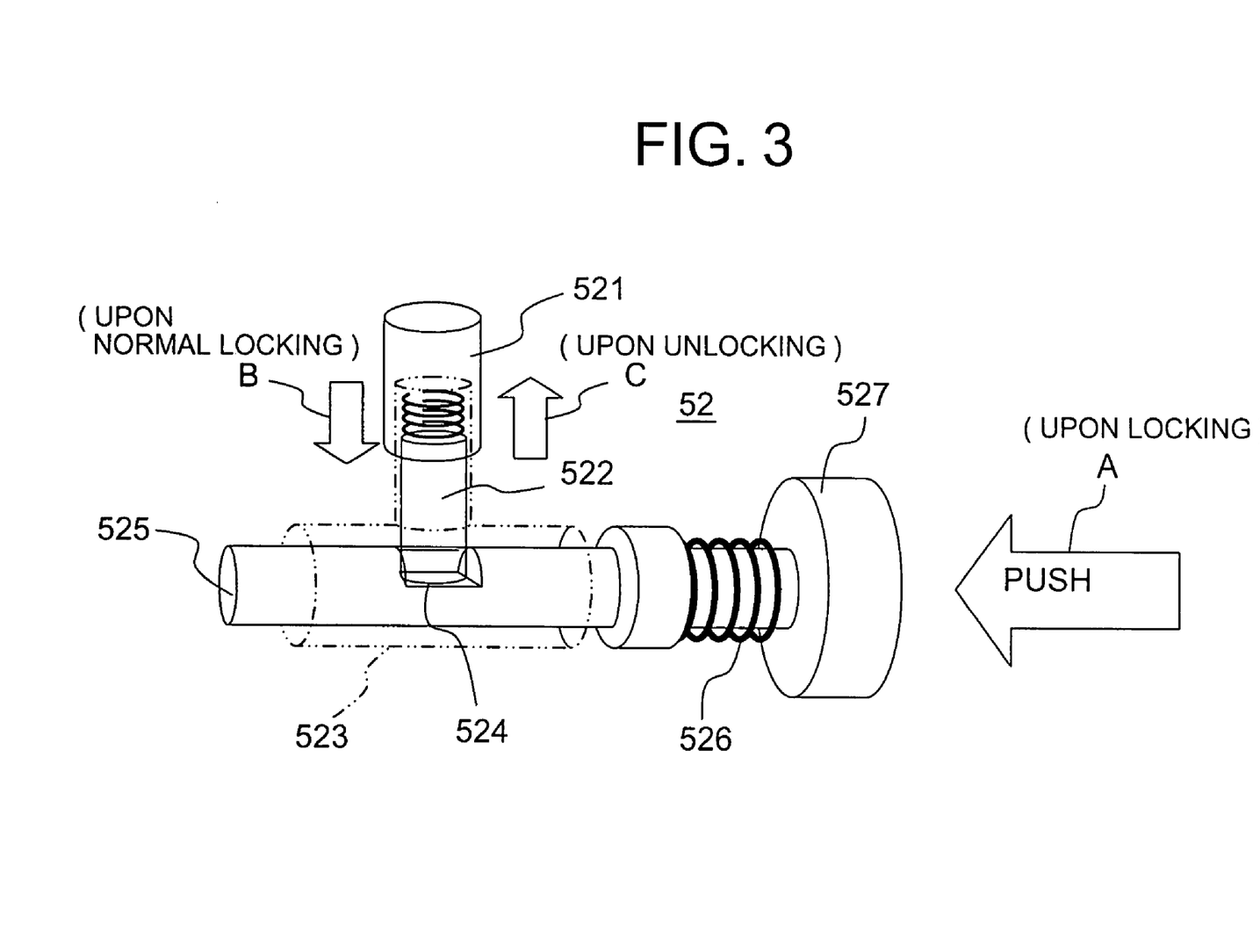
FIG. 3 is a perspective view showing an example of a specific configuration of a steering locking section according to the first embodiment of the present invention.

FIG. 3 is a perspective view that shows an example of the concrete configuration of the steering locking section 52 in FIG. 2, in particular for use with a motorcycle.

In FIG. 3, the steering locking section 52 includes an electromagnetic solenoid 521 that is excited upon unlocking, a stopper 522 in the form of an operating portion of the electromagnetic solenoid 521, a lock bar 523 that is in engagement with the stopper 522, an engaging portion (concave portion) 524 that is formed on a center upper surface of the lock bar 523, an operating end 525 of the lock bar 523, a spring 526 that serves to urge the lock bar 523 in an unlocking direction (to the right side in FIG. 3), and a lock button 527 in the form of an operating portion of the lock bar 523.

In a locked state of the steering system (steering wheel), the stopper 522 of the electromagnetic solenoid 521 is in engagement with an engaging portion 524 of the lock bar 523, and the operating end 525 of the lock bar 523 is in engagement with a rotary member (not shown) of the steering system to lock the steering system against rotation.

In FIGS. 1 and 2, the engine 70 is installed on the vehicle for generating a propulsion or driving force.

The portable device 1 and the on-board device 2 perform two-way communications through the respective transmitter receivers 10, 11, 20 and 21.

That is, the control circuit 22 in the on-board device 2 transmits, in response to an operation signal of the switch 31, a query signal (trigger signal) 102 including the verification code from the transmitting circuit 20 to the portable device 1.

Also, the control circuit 12 of the portable device 1 receives the query signal 102 from the on-board device 2 through the receiving circuit 11, reads the encrypted code from the storage circuit 13, and returns an answer signal 101 including the encrypted code corresponding to the query signal 102 from the transmitting circuit 10 to the on-board device 2.

As a result, the control circuit 22 in the on-board device 2 determines whether the answer signal 101 received from the portable device 1 corresponds to the query signal 102. When it is determined that the answer signal 101 is normal (i.e., corresponds to the query signal), the control circuit 22 generates an unlocking control signal to unlock the steering lock of the vehicle, and permits starting of the engine 70.

The unlocking control signal generated from the control circuit 22 is input to the steering lock control circuit 528 in the steering locking section 52, whereby the steering lock control circuit 528 drives the electromagnetic solenoid 521 (see FIG. 3) through the electromagnetic solenoid drive circuit 529.

Here, note that the single switch (button) 31 mounted on the vehicle can carry out, only by being repeatedly pressed, the driving of the steering lock section 52, the turn-on operation of the system relay 6, the activation of the power supply circuits (vehicle power supply) 26, 82 to which electric power is supplied from the on-board battery 9 (turning on of the system power supply), and the driving of a cranking device (starting of the engine 70) in a selective manner.

At this time, as an operation mode of the switch 31, it is possible to select a repeated operation (on/off) for a short time or a continuous operation (continuously on) for a long time.

For instance, when the control is sequentially shifted by the repeated operation of the switch 31 for a short time, a normal determination according to the query signal 102 and the answer signal 101 is made upon each operation of the switch 31.

On the other hand, when the control is continuously shifted by the continuous operation of the switch 31 for a long time, a normal determination according to the query signal 102 and the answer signal 101 is made only for the first time.

Further, by operating the switch 31, it is possible to perform the turning off control of the system power supply (stopping of the engine 70) through the system relay 6.

The control circuit 22, the engine control section 81, the meter control circuit 91, and the steering lock control circuit 528 are installed on the on-board device 2, the engine control device 8, the meter (unit) 90, and the steering locking section 52, respectively, as individual microprocessor units (hereinafter referred to as "MPUs"), in which is stored common data inherent or specific to the vehicle to which they themselves belong.

The MPU (control circuit 22) of the on-board device 2 performs mutual communications to the respective MPUs 81, 91, 528 of the peripheral equipment, and compares the common data possessed by itself with the common data stored in each of the MPUs 81, 91, 528, so that when both pieces of the common data coincide with other, it unlocks the steering locking section 52, and at the same time outputs an engine starting permission signal to permit the starting of the engine 70 to the engine control device 8.

For instance, the common data comprises one and the same data related to the various units 50 (90, 52), vehicle specific data to specify an inherent vehicle, unit specific data to specify each of the various units 50, or propellant recognition data to recognize, through data transmission between the on-board device 2 and the various units 50, that a vehicle is the inherent vehicle.

In addition, when the pieces of common data possessed by a predetermined number or all of the various units 50 are different from one another, the on-board device 2 inhibits the starting of the engine 70 installed on the vehicle or the movement of the vehicle.

Now, reference will be made to the operation of the respective circuits, as shown in FIGS. 1 and 2.

First of all, when a driver (user) who has a regular or authorized portable device 1 controls the switch 31 in the neighborhood of a specific or driver's own vehicle, the control circuit 22 in the on-board device 2 reads the verification code from the storage circuit 23, and radio transmits a trigger signal to verify the code through the transmitting circuit 20 as the query signal 102.

At this time, if the driver (user) having the portable device 1 exists in a range of transmission of the on-board device 2, the receiving circuit 11 in the portable device 1 can receive the query signal (trigger signal) 102.

Even if the person who does not have the authorized portable device 1 controls the switch 31, no signal will be sent, received and verified.

Subsequently, by referring to the verification code contained in the query signal 102, the control circuit 12 in the portable device 1 makes a determination as to whether an encrypted code is to be sent.

The determination processing at this time can be replaced by another determination processing in which it is determined whether a so-called ID code is received. In other words, by determining from which vehicle the verification code received from the on-board device 2 has been sent, it is possible to react only to the verification code sent from the specific or driver's own vehicle.

If it is determined that the verification code received has been sent from the subject vehicle, the control circuit 12 calls the encrypted code from the storage circuit 13, and transmits it via radio waves as the answer signal 101 through the transmitting circuit 10.

Here, note that the battery 14 in the portable device 1 is a power supply source to operate the respective circuit parts, and it becomes in a standby state waiting for receipt of the query signal 102 in a low power consumption mode so as not to waste the power supply from the time when the transmission of the answer signal 101 is finished until the following query signal 102 is received.

In addition, the battery 14 is constructed into an energy-saving type capable of suppressing the consumption of electric energy so that it is actuated to make it possible to supply electric power upon receipt of the query signal 102.

The on-board device 2 receives the answer signal 101 (including the encrypted code) from the portable device 1 through the receiving circuit 21, and the control circuit 22 in the on-board device 2 calls the verification code stored in the storage circuit 23 to verify it with the encrypted code received.

When it is determined, as a result of the verification, that the verification code and the encrypted code are coincide with each other, the control circuit 22 outputs a control signal 27 for "unlocking" from the output circuit 24 if the steering system is locked, for instance.

At this time, the on-board device 2 and the steering locking section 52 into which common data inherent to the specific vehicle is built perform the sending and receiving of the common data through the communication line 100.

The control circuit 22 in the on-board device 2 compares the common data in the on-board device 2 and the common data from the steering locking section 52 with each other, and outputs a control signal so as to unlock the steering locking section 52 after these pieces of common data coincide with each other. On the other hand, when these pieces of common data do not coincide with each other, the control circuit 22 maintains the locked state of the steering locking section 52 without outputting an unlock signal.

In addition, when the user controls the switch 31 again, verification of ID codes is carried out similarly, as described above.

If it is determined, as a result of this verification, that the ID codes (i.e., the encrypted code and the verification code) coincide with each other, the control circuit 22 in the on-board device 2 generates a control signal 27 from the output circuit 24 to turn on the system relay 6, whereby the engine control device 8 is actuated.

Also, the control circuit 22 outputs a signal to permit the starting of the engine 70 to the engine control device 8 through the communication line 100.

Here, note that when the encrypted code and the verification code do not coincide with each other, the control signal 27 is not generated from the on-board device 2, and hence the system relay 6 is not turned on.

Before the engine starting permission signal is output, the on-board device 2 and the engine control device 8 perform the sending and receiving of common data, as previously stated, and after coincidence of the respective pieces of common data, the on-board device 2 outputs an engine starting permission signal. In addition when the common data possessed by the on-board device 2 and the common data in the engine control device 8 do not coincide with each other, the on-board device 2 does not output a signal to permit the starting of the engine 70, and interrupts the system relay 6 after a fixed period of time.

Moreover, the steering lock unlocking sensor 51 for detecting the unlocking of the steering lock and the steering locking section 52 of the electromagnetic type for locking the steering system are connected to the control circuit 22, as stated above.

Further, the indicator lamp 53 for making a variety of kinds of indications, the hazard relay 54 for providing warnings similar to the indicator lamp 53, the alarm buzzer 55 for generating a warning sound upon occurrence of a theft, and the vibration sensor (not shown) are connected to the output circuit 24.

The indicator lamp 53 performs an unlocking abnormal indication of the steering locking section 52, an actuation abnormality indication of the engine control device 8, an alarm indication at the time of theft, or the like.

When the result of the verification shows coincidence, the hazard relay 54 drives a flasher lamp so as to give an answer-back indication, whereas upon occurrence of a theft, it drives the flasher lamp to flash for warning.

The vibration sensor senses the occurrence of a theft by detecting the vibration of the vehicle in an engine operation non-permitted state.

Further, the engine control section 81 (operation control part of the engine 70) in the engine control device 8 outputs a drive signal corresponding to the operating conditions of the engine 70 from the output circuit 84, whereby the various kinds of actuators 71 is controlled so as not to permit the operation of the engine 70.

Not only the fall sensor 72 for detecting the fall of the vehicle but also a variety of kinds of other sensors (not shown) for detecting the operating conditions of the engine 70 (the temperature of intake air, the temperature of engine cooling water, the amount of intake air, etc.) necessary for engine control are connected to the engine control section 81.

Here, reference will be made to an unlocking operation by the steering locking section 52 when the result of code verification shows coincidence.

In FIG. 3, electric power is applied to the electromagnetic solenoid 521, whereby the stopper 522 engaged with the engaging portion 524 of the lock bar 523 is disengaged in a direction of an arrow under the action of the electromagnetic solenoid 521, as a result of which the lock bar 523 moves in a direction toward the lock button 527 by the resilience or restoration force of the spring 526, and the operating end 525 of the lock bar 523 comes off from engagement with the rotary member (not shown) of the steering system thereby to be unlocked. Here, note that locking of the steering system is carried out by hand by pushing the lock button 527.

Next, reference will be made to the operation of the propellant anti-theft system from the time when the driver unlocks the steering lock until the engine 70 is started while referring to FIG. 4 together with FIG. 1 through FIG. 3.

Figure 4:
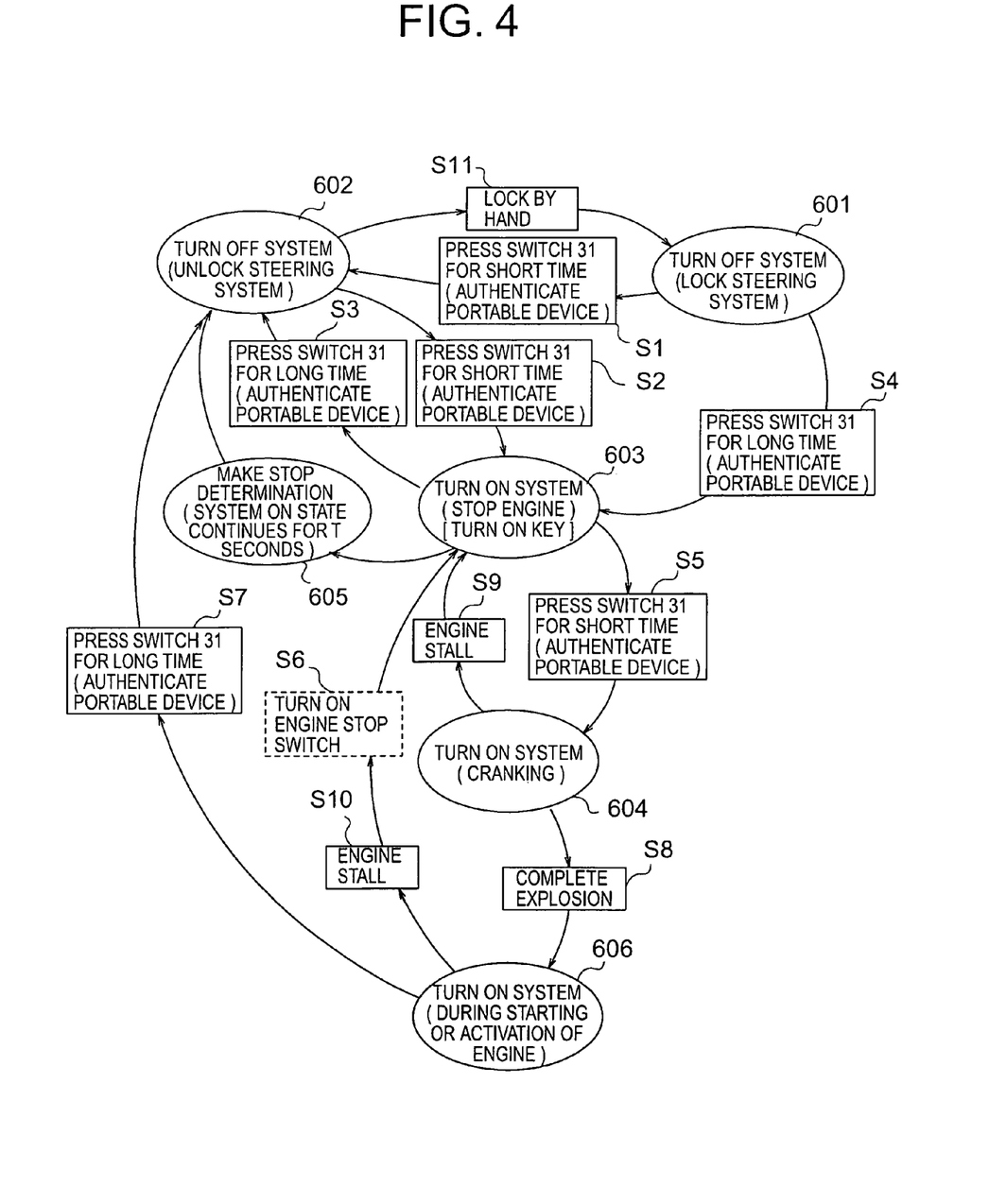
FIG. 4 is an explanatory view in the form of a flow chart showing the transition of the operating state of the propellant anti-theft system at the time of switching operation according to the first embodiment of the present invention.

FIG. 4 is an explanatory view that shows the transition of the operating state of the propellant anti-theft system at the time of switching operation according to the first embodiment of the present invention, in which an identifying or specifying operation of the system in a motorcycle from a steering lock unlocking mode to the permission of operation of the engine 70 through an engine starting mode is illustrated by using a flow chart.

In FIG. 4, first of all, in an initial state of the system (during the steering system is being locked), the system is in an off state (step 601).

Here, when the switch 31 is pressed for a short time, the control circuit 22 in the on-board device 2 is operated in response to this to compare the encrypted code received from the portable device 1 with the verification code thereby to carry out the authentication of the portable device 1 (step S1).

When it is determined in step S1 that the encrypted code and the verification code coincide with each other, the locking of the steering system is unlocked in the off state of system (step 602).

On the other hand, when it is determined that the encrypted code does not coincide with the verification code, the existing off mode of the system (step 601) is continued.

Here, when the switch 31 is pressed for a short time in the unlocked state of the steering system (step 602), the control circuit 22 in the on-board device 2 compares again the encrypted code received from the portable device 1 with the verification code thereby to carry out the authentication of the portable device 1 (step S2).

When it is determined in step S2 that the encrypted code coincides with the verification code, the control circuit 22 activates the system relay 6.

As a result, the system shifts to an on state (but the engine 70 still remains in a stopped state) (step 603).

At this time, the engine control device 8 is started up, and at the same time the control circuit 22 provides an engine starting permission signal to the engine control device 8 through the communication line 100, whereby the various kinds of actuators 71 are put into an engine starting permission state.

In addition, in case where the system is to be returned form its on state (step 603 ) to its off state, the switch 31 is pressed for a long time (i.e., the portable device 1 is authenticated) (step S3).

In response to this, the control circuit 22 stops the driving of the system relay 6, whereby the system is returned to the off state (step 602).

On the other hand, when the system is left in the on state (step 603), the on-board device 2 stops the driving of the system relay 6 after the elapse of a fixed period of Ts [second] (e.g., 600 seconds), whereby the operating mode of the system is put into the off state (step 602).

On the other hand, when the switch 31 with the system being in the on state (step 603) is again pressed for a short time (or a starter switch is turned on) (step S5), the control circuit 22 turns on the starter relay 41 through the starter relay drive circuit 25.

As a result, the starter 4 is driven to operate over the predetermined time Ts [second] (e.g., 3 seconds), whereby the engine 70 can be cranked with the system being in the on state (step 604).

In step 603, when the system continues the on state for t seconds, a stop determination is made (step 605), whereby the system is returned to the off state (step 602).

When the engine 70 has been cranked to complete explosion immediately after or within the elapse of the predetermined time Ts (e.g., 3 seconds) (step S8), the engine 70 is put into a started state or a starting state with the system being in the on state (step 606).

At this time, when only the rotation of the engine 70 is to be stopped, it is possible to achieve the stoppage of the engine 70 by turning on a kill switch or engine stop switch (not shown) (step S6).

On the other hand, when the engine 70 is stalled with the system being in the on state (step 604) (step S9), or when the engine 70 is stalled during a starting state or an activating (cranking) state (step 604) (step S10), a return is performed to the engine stop state with the system being in the on state (step 603).

When the engine 70 is to be stopped during its rotation after cranking thereof (step 606), the system can be shifted to its off state (step 602) by pressing the switch 31 for a long time (step S7).

In order to shift the system from its off state under the unlocking of the steering system (step 602) to its off state under the locking of the steering system (step 601), the driver needs only to press the lock button 527 (see FIG. 3) by hand (step S11).

In addition, in order to shift the system from its off state under the locking of the steering system (step 601) to its on state (step 603) by starting the engine 70 at once or rapidly, the switch 31 is pressed for a long time (i.e., to authenticate the portable device 1) (step S4).

In response to this, the control circuit 22 substantially executes an unlocking operation of the steering locking section 52 and a system turning-on operation at the same time, whereby the system can be shifted directly from its off state (step 601) to its on state (step 603).

At this time, the control circuit 22 executes the comparison processing between the encrypted code of the portable device 1 and the verification code only once in step S4, so it is possible to achieve the shortening of the time of transition or shift to the engine starting mode.

Now, the operation of the control circuit 22 in the on-board device 2 in accordance with the operation time of the switch 31 (short pressing and long pressing) will be described in further detail while referring to timing charts in FIG. 5 and FIG. 6.

Figure 5:
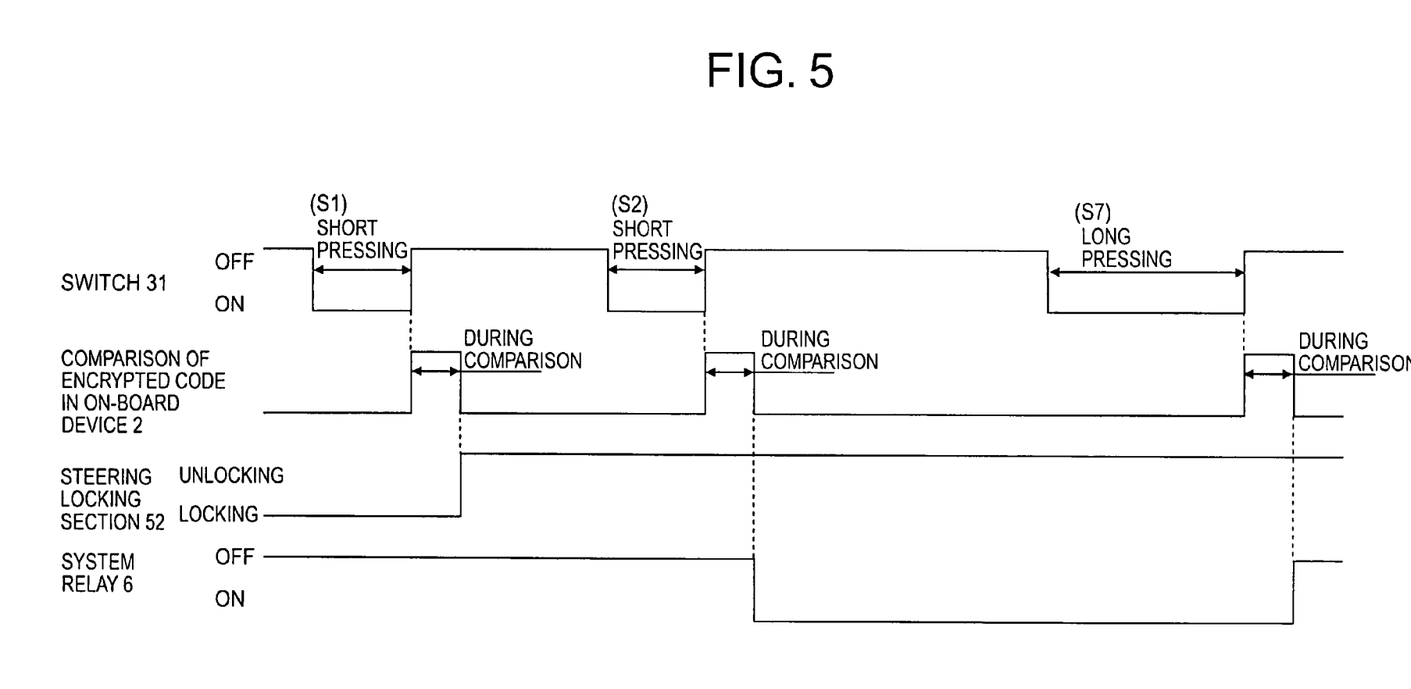
FIG. 5 is a timing chart illustrating the operation of the propellant anti-theft system when a switch is operated for a short period of time according to the first embodiment of the present invention.
Figure 6:
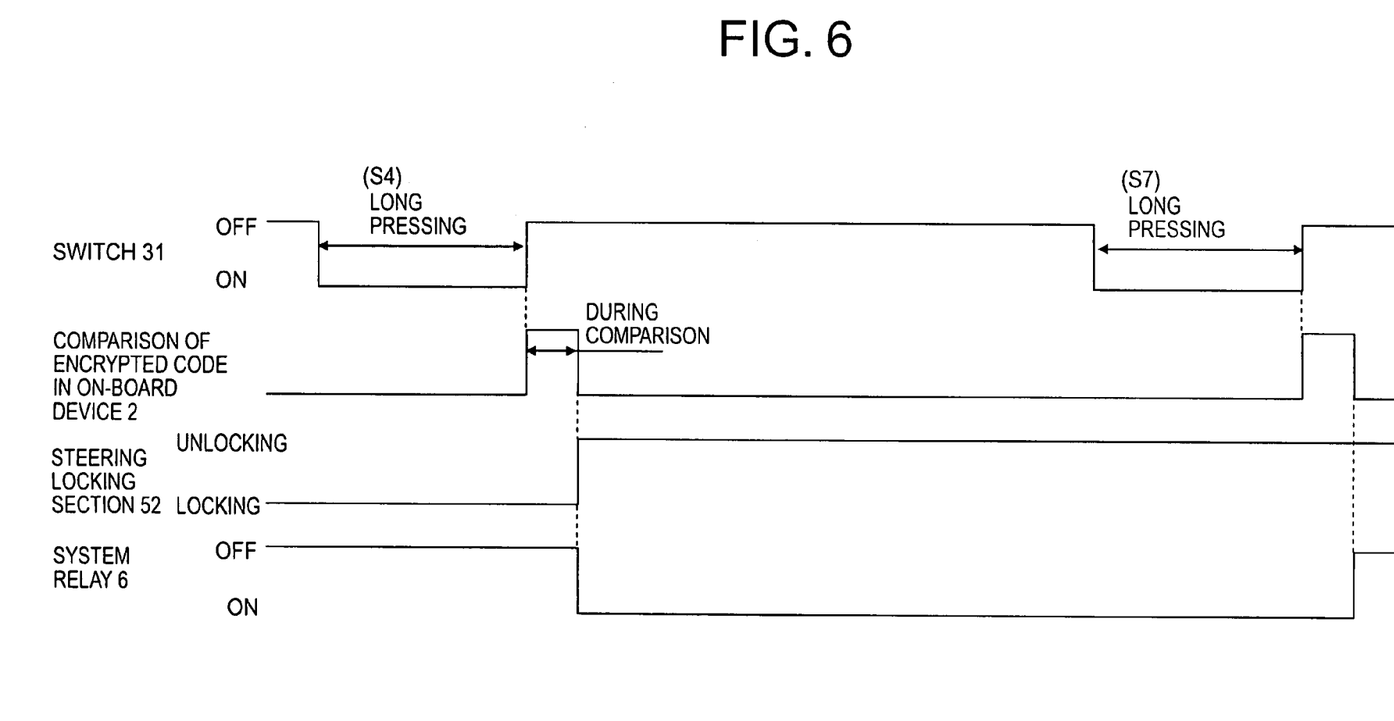
FIG. 6 is a timing chart illustrating the operation of the propellant anti-theft system when the switch is operated for a long period of time according to the first embodiment of the present invention.

FIG. 5 shows the operation of the control circuit 22 when the switch 31 is sequentially operated by short presses, and FIG. 6 shows the operation of the control circuit 22 when the switch 31 is operated by a long press.

In FIG. 5 and FIG. 6, the on/off operation of the switch 31 by the user, the operation of comparison between the encrypted code and the verification code in the on-board device 2, the unlocking/locking operation of the steering locking section 52 by the control circuit 22, and the activating/stopping operation of the system relay 6 by the control circuit 22 are shown as mutually associated with one another.

Also, the operation timing of the switch 31 is shown in association with respective steps S1, S2, S4 and S7 in FIG. 4.

First of all, in case where short pressing operations of the switch 31 steps S1 and S2 ) are sequentially carried out in a repeated manner in the system off state under the locked state of the steering system, as shown in FIG. 5, the control circuit 22 in the on-board device 2 executes encrypted code comparison processing after each of the short pressing operations, and performs processing in accordance with the operation timing if it is determined that the encrypted code coincides with the verification code.

That is, in response to a first short pressing operation (step S1), the control circuit 22 carries out an unlocking operation of the steering locking section 52 after comparing the encrypted code with the verification code, and in response to the following short pressing operation (step S2), the control circuit 22 turns on (activates) the system relay 6 after comparing the encrypted code with the verification code.

Moreover, when a long pressing operation of the switch 31 (step S7) is executed after the system relay 6 is activated, the control circuit 22 operates in response to this to turn off the system relay 6 after comparison of the encrypted code with the verification code.

On the other hand, when the long pressing operation of the switch 31 (step S4) is carried out with the system relay 6 being in the off state under the locked state of the steering system, as shown in FIG. 6, the control circuit 22 executes the activation of the system relay 6 and the unlocking operation of the steering locking section 52 substantially at the same time after comparing the encrypted code with the verification code.

In this case, the encrypted code comparison processing in the on-board device 2 is executed only once when the long pressing is operated (step S4), as previously stated, so the transitional or shift time to the engine starting mode can be shortened.

Now, reference will be made to the control of the propellant anti-theft system when at least one of the on-board device 2, the steering locking section 52, the meter 90 and the engine control device 8 all installed on the specific or subject vehicle is a stolen one.

The common data inherent to the specific vehicle is built into the on-board device 2, the steering locking section 52, the meter 90 and the engine control device 8, as stated above.

After verification of the code data between the portable device 1 and the on-board device 2 holds, the control circuit 22 of the on-board device 2 outputs a control signal to unlock the steering system to the steering locking section 52 through the communication line 100.

At this time, when the result of comparison between the individual pieces of common data shows coincidence on the basis of the mutual communications between the on-board device 2 and the steering locking section 52 into which the common data is built in advance, the control circuit 22 outputs a control signal to unlock the electromagnetic solenoid 521 of the steering locking section 52, whereas when the individual pieces of common data do not coincide with each other, the control circuit 22 maintains the locked state of the steering locking section 52.

Then, before a signal to permit the starting of the engine 70 is output from the on-board device 2 to the engine control device 8, the control circuit 22 of the on-board device 2 performs transmission and comparison of common data between the on-board device 2 and the engine control device 8, and after verifying coincidence between the common data of its own and the common data of the engine control device 8, the control circuit 22 outputs a signal to permit the starting of the engine 70, whereas when the respective pieces of common data do not coincide with each other, the control circuit 22 does not output an engine starting permission signal, and interrupts the system relay 6 after a fixed period of time.

Subsequently, when the system relay 6 is driven to operate, similarly with respect to the meter 90, too, the control circuit 22 performs the transmission and comparison of common data between the on-board device 2 and the meter 90, and interrupts the system relay 6 after a fixed time when the common data of its own and the common data of the meter 90 do not coincide with each other.

Thus, the control circuit 22 of the on-board device 2 compares the common data of its own and the common data of the steering locking section 52, the meter 90, or the engine control device 8, and does not turn on the system relay 6 when both of the common data show non-coincidence.

Further, even when the engine control device 8 or the various units 50 are not connected to the on-board device 2, or when the communication line 100 is broken or disconnected, the control circuit 22 of the on-board device 2 neither puts the steering locking section 52 into an unlocked state nor turns on the system relay 6.

Accordingly, even if the on-board device 2, the steering locking section 52, the meter 90 or the engine control device 8, each comprising a stolen object, is installed on the vehicle, the vehicle cannot be started at all.

In addition, since these vehicle parts, if stolen, can not be reused, if the anti-theft system according to the first embodiment of the present invention is widely spread in the market, the theft of the vehicle parts can be effectively suppressed.

As described above, according to the first embodiment of the present invention, similar to well-known keyless systems (i.e., systems that can make it unnecessary to use a key and a key cylinder and perform unlocking by means of a portable device), it is possible to perform the locking/unlocking of the steering locking section 52 and the permission/stop of operation of the engine 70 in a simple and easy manner only by an operation of pressing the one switch 31 mounted on the vehicle without needing the labor of inserting a key into a key cylinder and turning the key. Besides, a mechanical failure due to the insertion of the key in the key cylinder can be prevented.

In addition, since unlocking is carried out by the portable device 1, others can not perform the unlocking of the steering system and the permission of operation of the engine 70 as long as an authorized driver possesses the portable device 1, so it is possible to prevent the vehicle from being stolen even if the driver is away from the vehicle while leaving the key inserted into the key cylinder.

Moreover, since there is no need to insert the key into the key cylinder, it becomes unnecessary for the driver to do the act of looking for a keyway or insertion hole in the key cylinder in the dark when the engine is started at night, and hence the unlocking of the steering system and the starting of the engine can be carried out in a simple and easy manner.

Further, there is no need to take any measure that invites an increase in cost, such as providing a lamp to the key cylinder, so the system can be provided at low cost.

Furthermore, since the key cylinder can be made unnecessary, the degree of freedom of the design in the vicinity of the driver's seat can be increased.

In addition, by turning off the steering locking section 52, and fixing the steering system of the vehicle against rotation, it is possible to further improve the anti-theft function of the propellant anti-theft system.

Moreover, with the engine 70 being in an operation non-permitted state under the control of the control circuit 22, for instance, when the vibration of the vehicle at the time of theft is detected by the unillustrated vibration sensor, a hazard lamp (not shown), the alarm buzzer 55 or the like is driven through the hazard relay 54 to generate a warning such as light, sound, etc. As a result, the driver and persons thereabout can be informed of the occurrence of theft in a reliable manner, thus making it possible to further improve the anti-theft function.

Further, when the engine 70 shifts from an operating state to a stopped state, the control circuit 22 controls, in response to this, the engine 70 in such a manner that the engine 70 is put into an operation non-permitted state. Accordingly, the restarting of the engine 70 can be inhibited soon after the engine 70 is stopped or the system is turned off (step 602), thereby making it possible to further improve the anti-theft function.

Furthermore, in case where the engine stall continues for a fixed time during T [second] or more after the operation of the engine 70 is permitted, the control circuit 22 turns off the system relay 6 thereby to put the engine 70 into an operation non-permitted state. As a result, it is possible to prevent the theft of the vehicle in a reliable manner even if the driver leaves the vehicle in a short time immediately before driving the vehicle, whereby the anti-theft function of the propellant anti-theft system can be further improved.

As described above, according to the on-board anti-theft system of the present invention, the on-board device 2 and the portable device 1 are constructed so as to perform two-way communications with each other in the following manner. That is, a query signal is sent from the on-board device 2 to the portable device 1 in response to an operation of the switch 31, and an answer signal to the query signal is returned from the portable device 1 to the on-board device 2, whereby when the answer signal corresponds to the query signal, the on-board device 2 unlocks the steering locking section 52 and gives permission to start the engine 70. Common data inherent to the vehicle is stored in the on-board device 2, the engine control device 8 and the various units 50, all of which are installed on the vehicle, and only when the common data in the on-board device 2 and the common data in the engine control device 8 and the various units 50 coincide with each other, the permission to unlock the steering locking section 52 and to start the engine 70 is made, whereby an anti-theft effect can be enhanced in a remarkable manner, and the theft and reuse of vehicle parts can be suppressed by spreading the system in the market.

In particular, in case where the system is applied to motorcycles requiring low cost, it is possible to achieve an accident prevention system at low cost, thus providing a large advantageous effect.

Although in the above-mentioned embodiment, reference has been made as an example to the case where the present invention is applied to a motorcycle, it is needless to say that the invention can also be applied to other arbitrary propellants that are propelled by the engine 70 (e.g., motor vehicles, ATVs, ships, and jet propulsion boats, etc.).

In addition, the common data inherent to the vehicle may be directly stored in the respective MPUs 22, 81, 91, 528 or may be stored in memory sections connected to the MPUs, respectively.

While the invention has been described in terms of a preferred embodiment, those skilled in the art will recognize that the invention can be practiced with modifications within the spirit and scope of the appended claims.

What is claimed is:

1. A vehicle anti-theft system comprising:
    an engine and a vehicle side device installed on a vehicle;
    an engine control device and a manually operable switch connected to said vehicle side device;
    a plurality of units including a steering locking section connected to said vehicle side device; and
    a portable device that is possessed by a driver of said vehicle;
    said vehicle side device comprising:
    a vehicle side transmitter receiver for performing two-way communications between said vehicle side device and said portable device;
    a vehicle side storage circuit that stores a verification code for said portable device; and
    a vehicle side control circuit that is connected to said vehicle side transmitter receiver, said vehicle side storage circuit and said switch;
    said portable device comprising:
    a portable device side transmitter receiver for performing two-way communications between said portable device and said vehicle side device;
    a portable device side storage circuit that stores an inherent encrypted code corresponding to said vehicle; and
    a portable device side control circuit that is connected to said portable device side transmitter receiver and said portable device side storage circuit;
    wherein said vehicle side control circuit and said vehicle side transmitter receiver send a query signal containing said verification code to said portable device side transmitter receiver in response to an operation signal of said switch;
    said portable device side control circuit and said portable device side transmitter receiver receive said signal sent from said vehicle side device thereby to read said encrypted code from said portable device side storage circuit, and at the same time to send an answer signal containing said encrypted code corresponding to said query signal to said vehicle side transmitter receiver;
    when said answer signal corresponds to said query signal, said vehicle side control circuit unlocks said steering locking section and at the same time permits starting of said engine;
    said engine control device and said plurality of units are provided with microprocessor units installed thereon, respectively;
    said respective microprocessor units of said engine control device and said plurality of units have common data between themselves and said vehicle side device; and
    said vehicle side control circuit compares the common data that is possessed by itself and the common data that is stored in said respective microprocessor units with each other, and unlocks said steering locking section and at the same time outputs a signal to permit starting of said engine to said engine control device when both of said common data coincide with each other.

2. The vehicle anti-theft system as set forth in claim 1, wherein
    said plurality of units include a meter unit; and
    said meter unit includes a microprocessor unit having said common data.

3. The vehicle anti-theft system as set forth in claim 1, wherein said common data comprises one and the same data for said plurality of units, vehicle specific data to specify an inherent vehicle, or unit specific data to specify said plurality of units.

4. The vehicle anti-theft system as set forth in claim 1, wherein said common data comprises vehicle recognition data for recognizing, through data transmission between said vehicle side device and said plurality of units, that said vehicle is an inherent vehicle.

5. The vehicle anti-theft system as set forth in claim 1, wherein when the individual pieces of common data possessed by a predetermined number or all of said plurality of units are different from one another, said vehicle side device inhibits starting of said engine installed on said vehicle or movement of said vehicle.

6. The vehicle anti-theft system as set forth in claim 1, wherein said vehicle is a motorcycle.

* * * * *